United States Patent [19]

Gonda et al.

[11] 4,335,682
[45] Jun. 22, 1982

[54] ANIMAL TRAINING APPARATUS

[75] Inventors: Gerald J. Gonda; John Vancza, Jr., both of Tucson, Ariz.

[73] Assignee: Tri-Tronics, Inc., Tucson, Ariz.

[21] Appl. No.: 247,313

[22] Filed: Mar. 18, 1981

[51] Int. Cl.³ ............................................. A01K 15/00
[52] U.S. Cl. .................................................... 119/29
[58] Field of Search .............. 119/29, 106; 340/384 E; 361/232; 343/718

[56] References Cited

U.S. PATENT DOCUMENTS

| 3,137,271 | 6/1964 | Etter | 119/29 |
|---|---|---|---|
| 3,589,337 | 6/1971 | Doss | 119/106 X |
| 3,777,712 | 12/1973 | Gardner et al. | 119/29 |
| 3,980,051 | 9/1976 | Fury | 119/29 |
| 3,983,483 | 9/1976 | Pando | 343/718 X |
| 4,202,293 | 5/1980 | Gonda et al. | 119/29 |

OTHER PUBLICATIONS

Advertisement for A1-80 "WUF-E-NUF" Electric Collar manufactured by Tri-Tronics, Inc., 7060 E. 21st St., Tucson, AZ 85731.

Primary Examiner—Gene Mancene
Assistant Examiner—Robert P. Swiatek
Attorney, Agent, or Firm—Charles E. Wills

[57] ABSTRACT

A unit adapted to be worn by a dog or other animal acts under the control of a remote control unit to produce stimuli including an aversive electrical stimulus followed by a characteristic sound or other second stimulus in a relation conditioning the animal to have safety, relief and relaxation responses to that second stimulus. A different sound or other third stimulus is preferably produced just prior to the onset of the aversive electrical stimulation, and becomes a conditioned warning stimulus to the animal. The remote control unit is actuable to cause production of these three different stimuli in sequence, to condition the sounds to the desired responses, and after such conditioning can produce the two sounds independently and without aversive electrical stimulation to control the animal's behavior and facilitate training of the animal.

20 Claims, 6 Drawing Figures

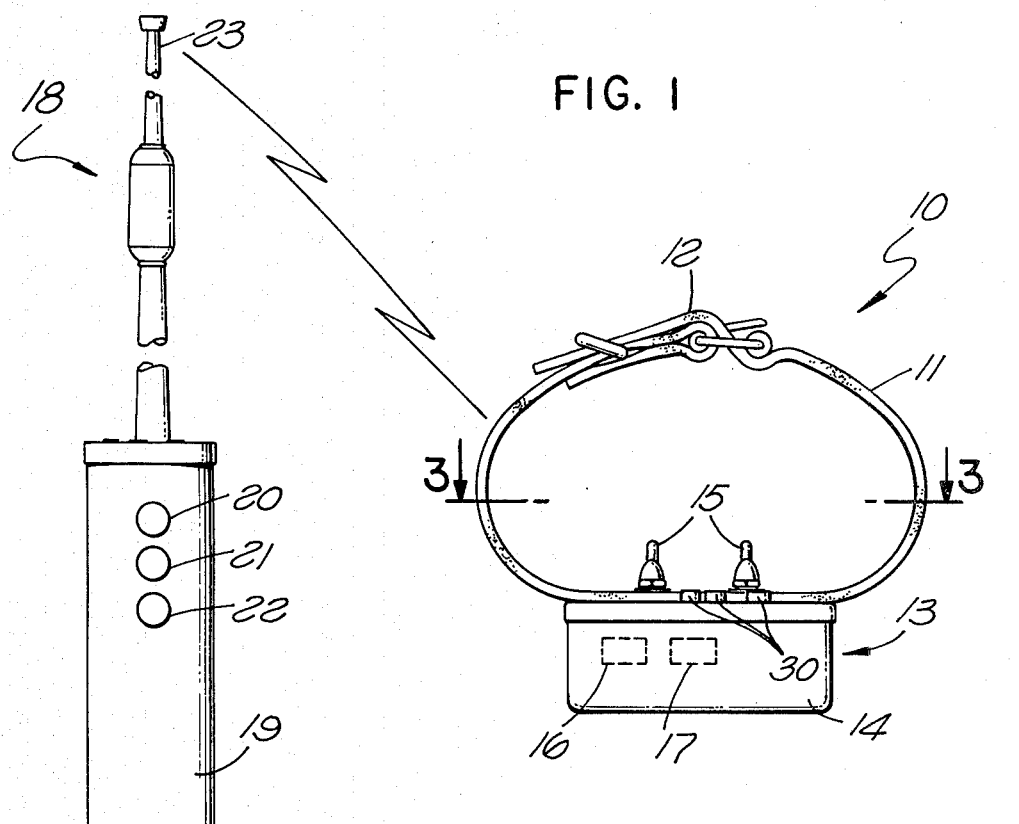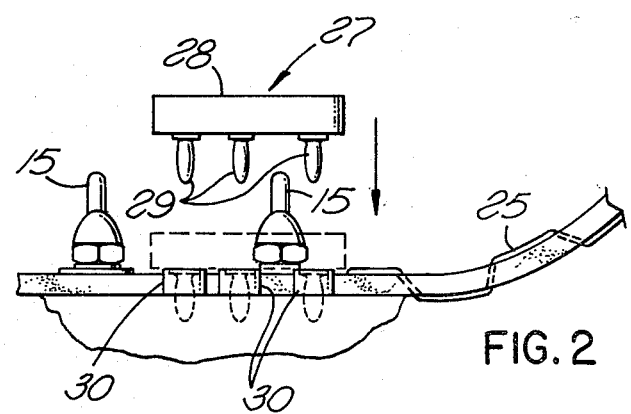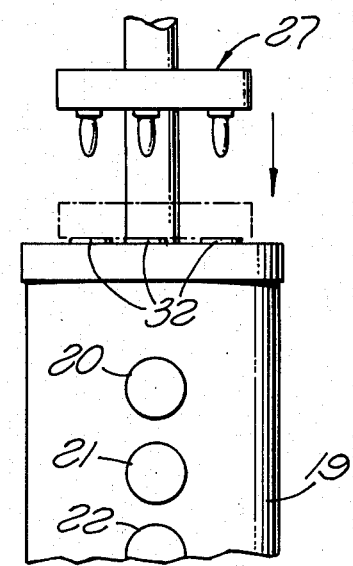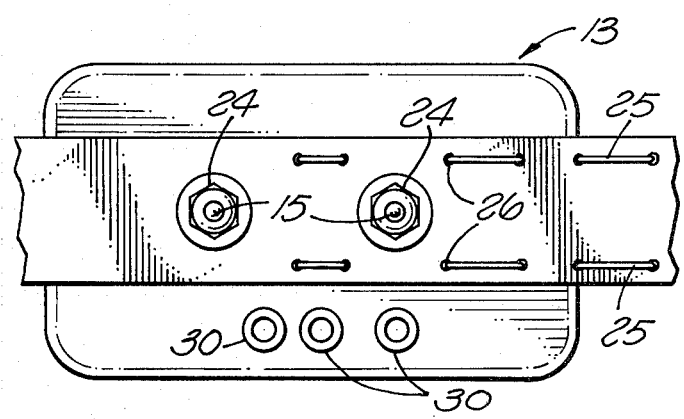
FIG. 1
FIG. 2
FIG. 3
FIG. 4

ANIMAL TRAINING APPARATUS

BACKGROUND OF THE INVENTION

This invention relates to improved devices for assisting in training a dog or other animal by inducing predetermined conditioned responses to various stimuli produced by the devices.

Training aids have been devised in the past for subjecting an animal to an aversive electrical stimulation in order to discourage a particular type of undesired behavior, such as excessive barking. U.S. Patent Application Ser. No. 874,033 filed Jan. 31, 1978, and now U.S. Pat. No. 4,202,293, shows such a device in which a sound is produced followed by aversive electrical stimulations to ultimately condition the animal to have the same response to the sound as to the aversive electrical stimulation. In one form of the invention shown in that application, the electrical and auditory stimuli are controlled by a remote unit held by a trainer and acting to produce radio signals which upon actuation of one push-button or other control element cause production of a sound followed immediately by aversive electrical stimulation, and upon actuation of another control element produce the sound independently of any aversive electrical stimulation.

SUMMARY OF THE INVENTION

The present invention provides an improved training device similar in some respects to that discussed above, but which is capable of attaining a much more effective and lasting learning effect on the animal. To achieve this result, a device embodying the invention takes advantage of the psychological and physiological feelings of safety, relief and relaxation which are inherently induced in an animal at the instant that a period of aversive stimulation is terminated. While the animal is experiencing these feelings, the device produces a characteristic sound or other stimulus, which is therefore associated in the mind of the animal with feelings of safety and can thereafter be utilized by a trainer to indicate approval of a particular behavior performed by the animal. During a conditioning period, the device worn by the animal can function to sequentially produce first a desired electrical stimulation unpleasant to the animal, and then the characteristic sound or other stimulus which is to be utilized as a conditioned safety stimulus. The apparatus may also function to produce at approximately the commencement of the aversive electrical stimulation, and preferably for a short interval just prior to the electrical stimulation, another different sound or other stimulus which by reason of its association with the commencement of the aversive electrical stimulation will acquire significance to the animal as a conditioned warning stimulus. This warning stimulus indicates to the animal that he can expect aversive electrical stimulation unless the desired behavoir is performed immediately. After the two sounds have been conditioned to the onset and termination of the aversive electrical stimulation, these sounds may be employed separately and without being accompanied by the aversive electrical stimulation to indicate to the animal either that he should immediately perform the desired behavior or that the behavior which he has just performed or at the moment is performing is approved by the trainer. Three push-buttons or other control elements on the remote control unit can place the three types of stimulation under the selective and direct control of the trainer at all times.

BRIEF DESCRIPTION OF THE DRAWINGS

The above and other features and objects of the invention will be better understood from the following detailed description of the typical embodiment illustrated in the accompanying drawings, in which:

FIG. 1 is a representation of an animal training device constructed in accordance with the invention;

FIG. 2 is an enlarged fragmentary view showing a portion of the collar carried unit of FIG. 1;

FIG. 3 is a fragmentary view taken on line 3—3 of FIG. 1;

FIG. 4 is an enlarged fragmentary representation of a portion of the remote control unit of FIG. 1;

DESCRIPTION OF THE PREFERRED EMBODIMENT

Figure 5:
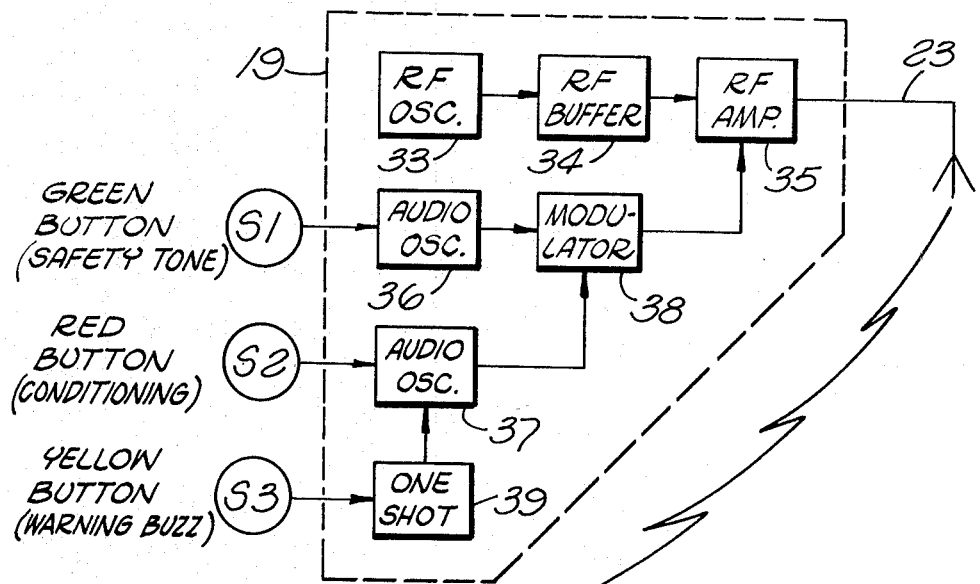
FIG. 5 is a block diagram of the circuitry of the remote control unit and collar carried unit of the invention.
Figure 5:
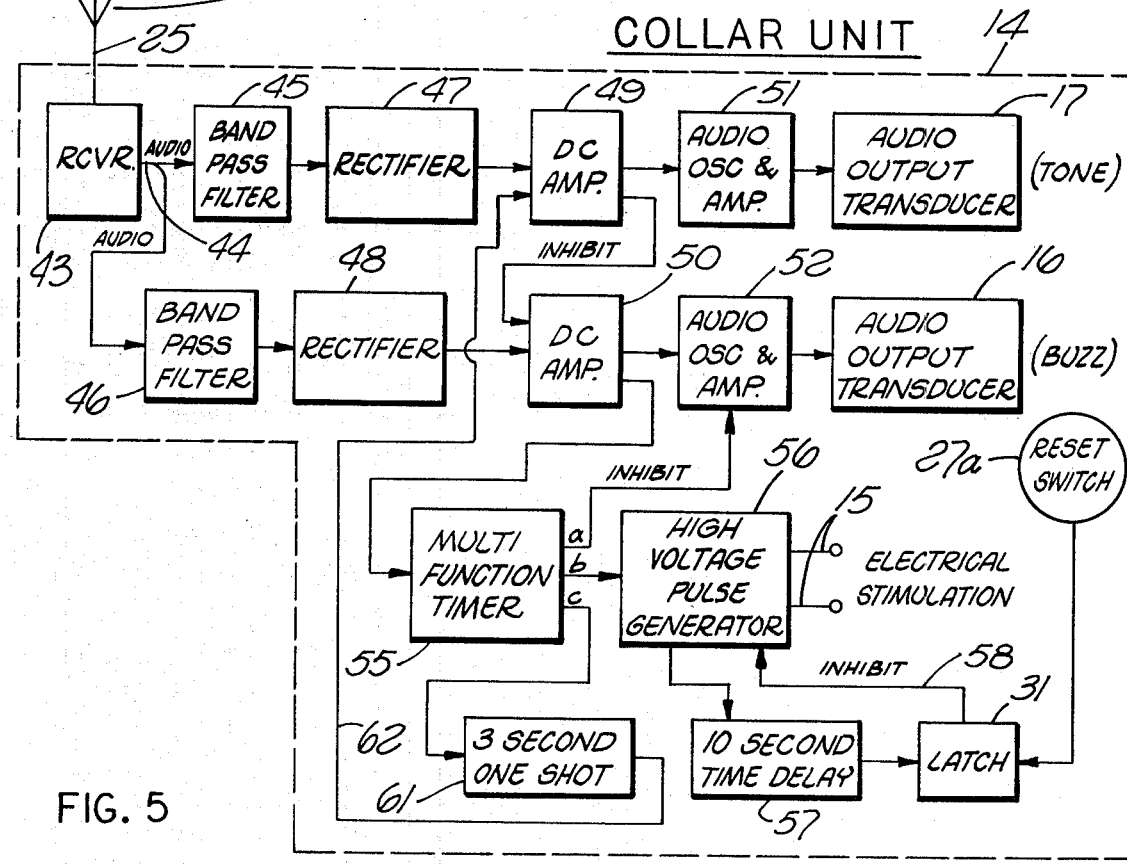

FIG. 1 illustrates at 10 an assembly which is to be worn by a dog and which includes a collar 11 adapted to extend about the dogs neck and having its opposite ends detachably and adjustably connected together by a buckle 12. The collar carries a unit 13 including a typically essentially rectangular case 14 carrying a pair of electrodes 15 projecting from the case and through the collar and adapted to contact the dog's skin to subject it to electrical stimulation. The case also contains two sound producing transducers 16 and 17, which produce two characteristically different sounds to be utilized as a warning stimulus and a safety, relief and relaxation stimulus respectively. The warning sound produced by transducer 16 may be a buzzing type sound, while the safety sound produced by transducer 17 may be a tone of a desired fairly high pitch. The sounds produced by both of the transducers can be heard by the animal through case 14. The case also contains the rest of the circuitry illustrated in the lower portion of FIG. 5.

For use in conjunction with the collar assembly 10 of FIG. 1, there is provided a remote control unit 18 which is carried by a trainer and which includes a case 19 containing the circuitry represented in block diagram form in the upper portion of FIG. 5. Three push-buttons 20, 21 and 22 are accessible from the outside of the case for manual actuation and act when pressed to operate the switches S1, S2 and S3 respectively of FIG. 5. The circuitry within case 19 of unit 18 is connected to a telescopic antenna 23 which transmits signals from unit 18 to the controlled assembly 10.

As seen in FIG. 3, the unit 13 may be attached to collar 11 by extension of the two parallel, conductive electrodes 15 through openings in a central portion of the collar, with nuts 24 being threadedly connected onto the terminals and acting to clamp the collar against the case of unit 13. The receiving antenna of the radio circuitry within case 14 may take the form of a wire or wires as illustrated in FIG. 3 carried by and extending along the collar and secured thereto by weaving the antenna wire 25 into and out of a series of openings 26 in the collar. The circuitry within unit 13 may be rendered operative by connection of a switching device 27 to unit 13, in the condition illustrated in broken lines in FIG. 2. This switching unit 27 may have an electrically insulative body 28 carrying a series of electrically conductive parallel prongs or pins 29 which are receivable within mating sockets 30 of unit 13 and are frictionally retained in their position of connection to unit 13. The sockets 30 are accessible from the outside of case 14, and when device 27 is connected into the sockets, conductors within the device 27 act to interconnect the internal circuitry in case 14 through sockets 30 in a pattern energizing that circuitry from batteries contained in case 14, and resetting a latch 31 (FIG. 5) which enables the electrical stimulating portion of the apparatus. In FIG. 5, a portion of the switch unit 27 of FIG. 2 is represented diagrammatically as a reset switch 27a for the latch 31. When the on-off switch unit 27 is not in its discussed position of connection to unit 13 for rendering its circuitry operative, the device 27 can be stored on the upper portion of case 19 of remote control unit 19. For this purpose, the case has three sockets 32 into which the prongs of unit 27 can be connected, but with those prongs then having no connection to the circuitry within case 19 but merely being utilized for releasably and frictionally retaining device 27 in an inactive position on remote control unit 18.

Referring now to the remote control circuitry as illustrated in the upper portion of FIG. 5, that circuitry may include a radio frequency oscillator 33 for producing a carrier wave delivered through a buffer 34 to a final amplifier 35 whose output is connected to antenna 23 for transmitting radio signals to the collar assembly 10. The carrier wave produced by oscillator 33 can be modulated selectively by audio signals at two different frequencies $f_1$ and $f_2$ produced by two audio oscillators 36 and 37. Actuation of switch S1 by depression of the upper, preferably green colored, push-button 20 of the remote control unit 18 energizes the first audio oscillator to deliver a signal at frequency $f_1$ to modulator 38, which modulates the carrier wave in amplifier 35 at that frequency. Similarly, actuation of switch S2 by the middle, preferably red, push button 21 of unit 18 energizes oscillator 37 to produce an audio output at frequency $f_2$ which is utilized by modulator 38 to modulate the carrier wave. Push-button 22, which is preferably yellow, actuates the third switch S3 which energizes a one shot multivibrator 39, acting in turn to energize oscillator 37 for a predetermined accurately timed relatively short interval preferably 180 milliseconds. Thus, each time switch S3 is actuated the oscillator 37 delivers to modulator 38 and RF amplifier 35 a short, accurately timed train of audio frequency oscillations at the frequency $f_2$.

Figure 6:
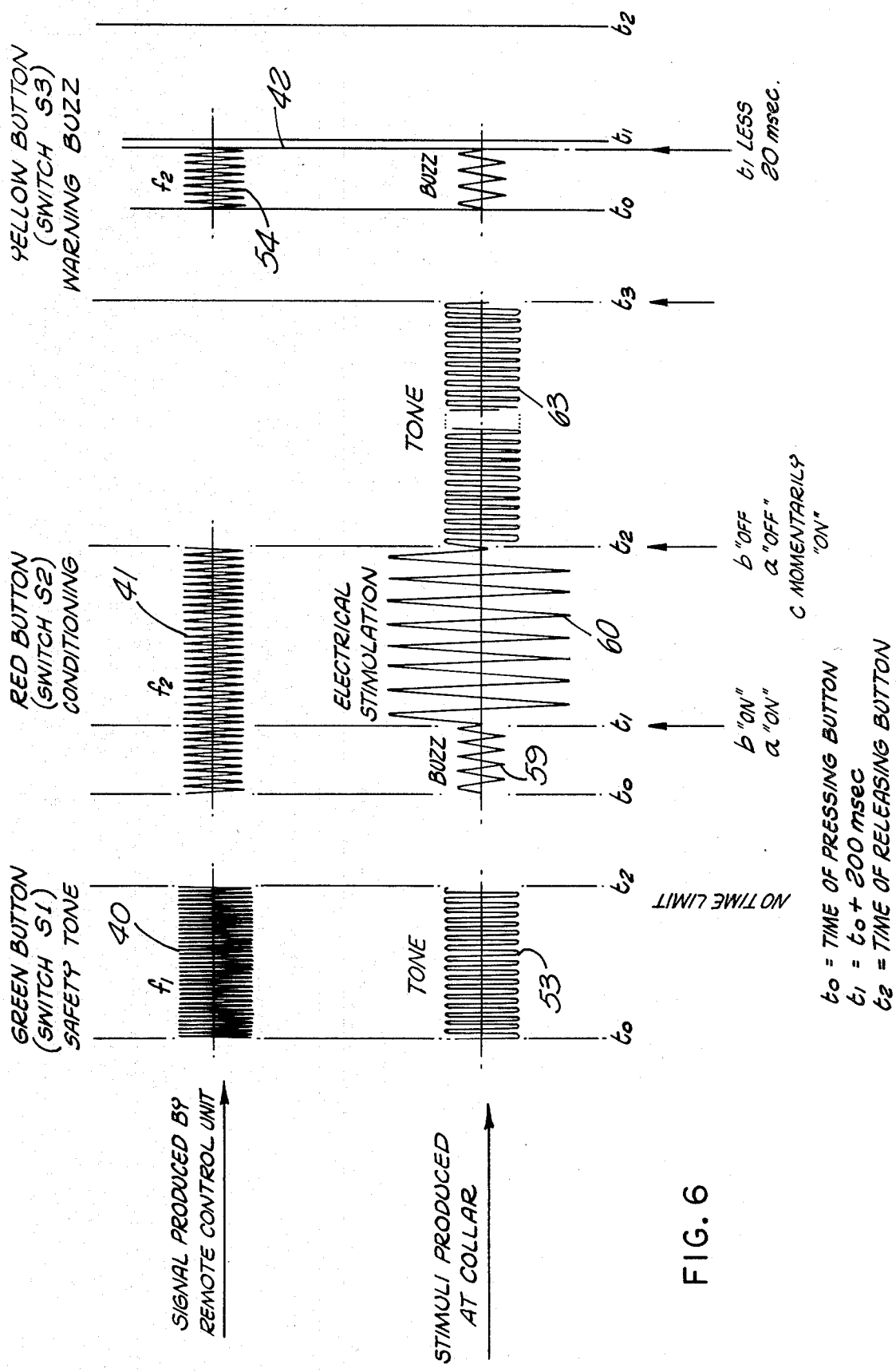
FIG. 6 is a timing study of the signals produced by the remote control unit and the stimuli produced by the collar carried unit.

The upper portion of FIG. 6 represents diagrammatically these three types of output signals which are transmitted by remote control unit 18 when the three push-buttons 20, 21 and 22 respectively are depressed. For example, when the green button 20 is depressed at time $t_0$ an output at the frequency $f_1$ as transmitted by the remote control unit, as represented at 40 in FIG. 6. This output continues for the entire period that pushbutton 20 is held in, and terminates at the time $t_2$ when the push-button is released. Similarly, when the red conditioning button 21 is pressed in at time $t_0$, this commences transmission of a signal at the frequency $f_2$, represented at 41 in FIG. 6, with that signal terminating at time $t_2$ when the push-button is released. In the right-hand portion of FIG. 6, the short burst at frequency $f_2$ commences at time $t_0$ when the yellow button controlling switch S3 is depressed, and the end of that burst is terminated automatically at 42 when the time interval for which one shot multivibrator 39 has been set expires.

These signals transmitted by remote control unit 18 are picked up by antenna 25 of the collar unit 10 and are delivered to a radio receiver 43 within case 14 which produces an audio output in line 44 including the two frequencies $f_1$ and $f_2$. Two band-pass audio filters 45 and 46 are adapted to pass only the frequencies $f_1$ and $f_2$ respectively, to deliver only the $f_1$ frequency signal to a rectifier 47 and only the $f_2$ signal to a rectifier 48. Rectifier 47 thus produces a D.C. output to an associated D.C. amplifier 49 only when the signal received by antenna 25 includes frequency $f_1$, and similarly rectifier 48 delivers a D.C. output to amplifier 50 only when the received signal includes frequency $f_2$. These signals amplified at 40 and 50 are used to turn on two audio oscillator and amplifier units 51 and 52, which energize transducers 17 and 16 respectively to produce the desired high pitch tone and buzz audible to the animal. Thus, when S1 of the remote control unit is actuated to transmit a signal at frequency $f_1$, the circuitry of collar assembly 10 causes transducer 17 to produce the characteristic relaxation or safety tone at a frequency determined by oscillator 51, which tone is represented at 53 in FIG. 6 and continues as long as button 20 is depressed but terminates as soon as that button is released. Depression of the lower button 22 to actuate switch S3 causes transmission of the short series of oscillations at frequency $f_2$ represented at 54 in FIG. 6, with resultant energization of transducer 16 for that same interval to produce a buzz at a frequency determined by oscillator 52, commencing when button 22 is depressed and terminating when the period of one shot multivibrator 39 expires or when the button is released, whichever occurs first.

The response which occurs in collar unit 10 when red conditioning button 21 is depressed is somewhat more complex than that which occurs when the green or yellow button is actuated. The initial response upon actuation of switch S2 by depression of the red button is the same as the initial response to depression of the yellow button 22, and results in the transmission of a signal at frequency $f_2$ as represented at 41 in FIG. 6, with that signal acting through units 46, 48, 50 and 52 to energize and commence the operation of buzzer 16. The transmitted signal at frequency $f_2$ is not affected by one shot multivibrator 39, as upon actuation of switch S3, but instead continues for as long as the red button which actuates switch S2 remains depressed. The output sound produced by transducer 16, however, is automatically terminated after expiration of a timed period which is just slightly longer than the period of one shot multivibrator 39. For this purpose, the output of direct current amplifier 50 which results from reception of the frequency $f_2$ signal by receiver 43 is delivered to a multifunction timer 55 in addition to the previously discussed delivery of the output of amplifier 50 to oscillator 52. When energized at time $t_0$ upon depression of the red remote control button 21, unit 55 commences timing of an interval of predetermined duration. At the expiration of that interval, designated as time $t_1$ in the central portion of FIG. 6, timer 55 produces outputs in lines a and b of FIG. 5 which continue as long as the input signal from amplifier 50 to timer 55 continues. The output in line a is delivered as an inhibit signal to oscillator 52, and acts to turn that oscillator off and end the sound produced by transducer 16. The output in line b energizes or turns on a high voltage pulse generator 56 which delivers a series of timed electrical pulses to electrodes 15 acting to aversively stimulate the animal intermittently for as long as the circuit 56 remains in its on condition. Commencement of energization of circuit 56 starts the operation of another timer 57, which is set for a ten second delay period and functions at the end of that period to actuate latch 31 to apply an inhibit signal through a line 58 to generator 56, automatically cutting off the stimulation to the animal. In the central portion of FIG. 6, the initial sound produced by transducer 16 is represented at 59, and the electrical stimulation produced by unit 56 is represented at 60.

Ordinarily, the red conditioning button for actuating switch S2 is not held depressed long enough to permit the ten second time delay circuit 57 to actuate latch 31 and cut off the electrical stimulation. Instead, the red button is usually released before expiration of a ten second interval, with resultant termination of the signal 41 at frequency $f_2$ received by antenna 25 of collar unit 10. When this signal at frequency $f_2$ ends, the output of amplifier 50 to timer 55 is turned off, and timer 55 responds by turning off the signals in lines a and b and producing a momentary output in line c. This signal in line c energizes a one shot multivibrator 61 which delivers a signal through line 62 to amplifier 49 energizing that amplifier and oscillator 51 to cause production of the characteristic relaxation tone by transducer 17. This tone, represented at 63 in FIG. 6, commences simultaneously with the termination of electrical stimulation and continues to the time $t_3$ when one shot multivibrator 61 turns off at the end of its predetermined interval of preferably three seconds.

With regard to the difference between the manner of actuation of the circuitry when the red and yellow buttons are pressed, it is noted that the interval for which multifunction timer 55 is set between the time $t_0$ when it is initially energized and the time $t_1$ when it acts to automatically energize output lines a and b is slightly greater than the timing period of one shot multivibrator 39. Thus, the short burst of oscillations represented at 54 in FIG. 6 which result when the yellow button is depressed is not long enough for the circuitry to reach a point at which timer 55 commences electrical stimulation of the animal. The period for which one shot multivibrator 39 is set may typically be 180 milliseconds as previously mentioned, and the period for which timer 55 is set before energization of its outputs a and b may be 200 milliseconds.

The purpose of the ten second time delay circuit 57 is to prevent inadvertent excessive electrical stimulation of the animal, by automatically turning off the pulse generator 56 if it is left on for more than the predetermined ten seconds or other desired period. After such automatic turn off of generator 56, latch 31 remains in a condition inhibiting further electrical stimulation of the animal until the latch is purposely reset by the reset switch represented at 27a. As indicated previously, this reset switch is a part of the turn on switching device 27, and the resetting function can be attained only by removing the device 27 and then reinserting it into its position of connection to the collar carried unit 13.

In using the apparatus described above, the trainer first places the collar assembly about the neck of the animal, with switch unit 27 in its active position energizing that assembly, and then controls the emission of sound and electrical stimuli by unit 10 by actuation of the three push-buttons 20, 21 and 22. To initially condition the animal, the red button 21 can be depressed when undesired behavior of the animal is seen, and the button released when that behavior ends; or the red button 21 can be depressed under a carefully controlled situation where the trainer shows the animal how to escape the electrical stimulation by responding properly to the trainer's command. Either of the aforementioned opportunities to depress the red button 21 is a constructive way to properly condition the sounds to the electrical stimulation. Depression of the button acts to first energize buzzer 16 to produce a sound intended as a warning stimulus, and at the time $t_1$ when that short period of sound emission ends, the electrical stimulation by terminals 15 commences as represented at 60 in FIG. 6. In addition to the basic effect of the electrical stimulation in indicating to the animal that his actions are not approved of by the trainer, the emission of the buzzing sound prior to the electrical stimulation can act as a warning stimulus giving the animal the opportunity to avoid the electrical stimulation by responding properly and immediately to the trainer's command. When the red button is released, one relaxation or safety tone 63 commences immediately upon termination of the electrical stimulations, as represented at time $t_2$ in FIG. 6. The inherent feeling of relaxation and safety experienced by the animal upon termination of the electrical stimulation is thus associated with the tone represented at 63 in FIG. 6 and produced by transducer 17 of FIG. 5, and as a result, the animal is conditioned to recognize that tone as an indication of approval, safety, relaxation, or the like. After several such uses of the red conditioning button, the desired conditioning to the buzzing sound and tone will have been ingrained into the animal, so that if he commences a behavior which is not desired by the trainer, disapproval can be conveyed by depression of the yellow button 22 actuating switch S3 to produce a short sound from transducer 16. This sound becomes a warning stimulus, indicating to the animal that unless the desired behavior is performed immediately, the electrical stimulation will not be avoided. Similarly, approved activity can be strengthened by pressing the green button 20 to actuate switch S1 and thus produce the safety or relaxation tone from transducer 17. If the conditioning to the sound stimuli are at any time not as desired, one or two uses of the red conditioning button will serve to reinforce the significance of the two sounds to the animal. It is found that use of the safety tone is in certain respects more effective in training an animal than is use of the warning buzz, since the safety tone has a positive type of action affirming correct behavior while the buzz can be at times more negative in action.

After the animal has been thoroughly trained by having responded properly and repeatedly to the sounds produced by unit 10 in association with certain behaviors, the trainer can gradually phase out the sounds and maintain very effective behavioral control with verbal commands only.

While a certain specific embodiment of the present invention has been disclosed as typical, the invention is of course not limited to this particular form, but rather is applicable broadly to all such variations as fall within the scope of the appended claims.

We claim:
1. An animal training device comprising a unit which is adapted to be worn by an animal and which includes:
   electrical stimulation means operable to aversively stimulate the animal;

additional means for producing an additional stimulus in a form other than aversive electrical stimulation and adapted to be sensed by the animal; and automatic control means operable to automatically actuate said additional means to produce said additional stimulus upon termination of said aversive electrical stimulation, to thereby condition said additional stimulus to the animal's safety, relief and relaxation responses which occur naturally upon termination of the aversive electrical stimulation.

2. An animal training device as recited in claim 1, in which said additional stimulus produced by said additional means is a characteristic sound.

3. An animal training device as recited in claim 1, in which said unit includes a collar adapted to be carried about the neck of the animal and carrying the remainder of the unit.

4. An animal training device as recited in claim 1, including a remote control unit to be operated by a trainer at a location remote from the animal and acting to commence operation of said electrical stimulation means and said additional means under the control of said automatic control means.

5. An animal training device as recited in claim 1, including a remote control unit having first manually actuated means operable by a trainer to commence operation of said electrical stimulation means and said additional means under the control of said automatic control means, and having second manually actuated means operable by a trainer to energize said additional means independently of said electrical stimulation means to produce said additional stimulus without being accompanied by electrical stimulation.

6. An animal training device as recited in claim 1, in which said unit includes a collar adapted to be carried about the animal's neck and carrying the remainder of said unit, said additional stimulus produced by said additional means being a characteristic sound, said device including a remote control unit for transmitting radio signals from a trainer to said unit worn by the animal, said unit worn by the animal including radio receiver means for receiving said signals, said remote control unit including first manually actuated means operable by the trainer to produce a signal energizing said electrical stimulation means and said additional means under the control of said automatic control means to produce electrical stimulation and said sound upon termination thereof, and said remote control unit including second manually actuated means operable by the trainer to produce a signal causing said additional means to produce said characteristic sound independently of electrical stimulation and as a conditioned safety, relief and relaxation stimulus.

7. An animal training device comprising a unit which is adapted to be worn by an animal and which includes:
electrical stimulation means operable to aversively stimulate the animal;
additional means for producing first and second additional stimuli which differ from one another and are in a form other than the aversive electrical stimulation and are adapted to be sensed by the animal; and
automatic control means operable to actuate said additional means in timed relation to said aversive electrical stimulation means in a relation causing emission of said first additional stimulus just prior to the average electrical stimulation and producing said second additional stimulus upon termination of said aversive electrical stimulation.

8. An animal training device as recited in claim 7, in which said unit includes a collar adapted to be carried about an animal's neck and carrying the remainder of the unit.

9. An animal training device as recited in claim 7, including manually actuated means for causing said additional means to produce said first additional stimulus without production of an aversive stimulation by said electrical stimulation means.

10. An animal training device as recited in claim 7, including manually actuated means for causing said additional means to produce said second additional stimulus without production of an aversive stimulation by said electrical stimulation means.

11. An animal training device as recited in claim 7, including first manually actuated means for causing operation of said electrical stimulation means and said additional means under the control of said automatic control means to produce an aversive stimulation with said first stimulus at approximately the commencement of the electrical stimulation and said second additional stimulus upon termination of the electrical stimulation;
second manually actuated means for causing said additional means to produce said first additional stimulus without production of an aversive stimulation or said second additional stimulus; and
third manually actuated means for causing said additional means to produce said second additional stimulus without production of an aversive stimulation or said first additional stimulus.

12. An animal training device as recited in claim 7, in which said first and second additional stimuli are two different characteristic sounds.

13. An animal training device as recited in claim 7, including a remote control unit operable by a trainer to produce signals receivable by and adapted to control said unit which is worn by an animal;
said remote control unit including first manually actuated means for producing a signal causing operation of said electrical stimulation means and said additional means under the control of said automatic control means to produce an electrical stimulation with said first stimulus at approximately the commencement thereof and said second stimulus upon termination of the electrical stimulation, second manually actuated means for producing a signal causing said additional means to produce said first additional stimulus without an electrical stimulation or said second stimulus, and third manually actuated means for producing a signal causing said additional means to produce said second stimulus without an electrical stimulation or said first stimulus.

14. An animal training device as recited in claim 13, in which said automatic control means are operable to terminate said first additional stimulus after a predetermined short interval of time and to commence said electrical stimulation essentially simultaneously with termination of the first stimulus.

15. An animal training device as recited in claim 14, in which said automatic control means are operable to commence said second stimulus substantially simultaneously with the termination of said aversive electrical stimulation.

16. An animal training device comprising:

a collar adapted to be worn about the neck of an animal;

a first unit to be carried by said collar and including a radio receiver; and a remote control unit to be carried by a trainer and having a radio transmitter for sending control signals to said receiver of said first unit;

said first unit including electrical stimulation means having electrodes engageable with the animal and operable to aversively stimulate the animal through said electrodes, a first audio output transducer operable to produce a first sound which is to function as a warning stimulus, a second audio output transducer operable to produce a second sound which is to function as a safety, relief and relaxation stimulus, and circuitry operable in first and second conditions to energize said transducers to produce said two sounds separately and in a third condition to energize said electrical stimulation means and said two audio output transducers to electrically stimulate the animal with said first sound being emitted prior to commencement of the aversive electrical stimulation and said second sound being emitted upon termination of the aversive electrical stimulation;

said remote control unit including first, second and third manually actuated elements, and circuitry operable to transmit signals from said remote control unit to said first unit which upon separate actuation of said first and second elements cause emission of said first and second sounds respectively, and which upon actuation of said third element cause production of said electrical stimulation with said first sound at the commencement thereof and said second sound upon termination of the aversive electrical stimulation.

17. An animal training device as recited in claim 16, in which said first unit and said remote control unit are operable upon operation of said third manually actuated element to commence said first sound followed by said electrical stimulation upon movement of said third element in a first direction and to terminate said electrical stimulation and commence said second sound upon movement of said third element in the opposite direction.

18. An animal training device as recited in claim 17, in which said first unit includes timing means for automatically terminating said second sound after a predetermined timed interval.

19. An animal training device as recited in claim 18, including timing means acting to automatically terminate said electrical stimulation after a predetermined timed interval.

20. An animal training device as recited in claim 19, in which said circuitry of said remote control unit includes a first oscillator causing emission of a signal by said remote control transmitter at a first frequency upon actuation of said third manually actuated element, a second oscillator causing emission of a signal from said remote control unit at a second frequency upon operation of said second manually actuated element and continuing until said element is released, and means causing a short timed emission of a signal at said first frequency upon actuation of said first element;

said first unit including means responsive to a signal at one of said frequencies to cause emission of said second sound, means responsive to said short timed emission of a signal at said first frequency upon actuation of said first element to cause emission of said first sound, and means responsive to reception of a longer signal at said first frequency upon operation of said third manually actuated element to produce said electrical stimulation with said first sound being emitted prior to the commencement of the electrical stimulation and said second sound commencing upon termination of the electrical stimulation.

* * * * *